US007258222B2

(12) United States Patent
Martí Sala et al.

(10) Patent No.: US 7,258,222 B2
(45) Date of Patent: Aug. 21, 2007

(54) ARTICLE POSITIONING MACHINE

(75) Inventors: Jaime Martí Sala, Barcelona (ES); Alex Martí Mercadé, Sant Cugat del Vallès (ES)

(73) Assignee: Jaime Marti Sala & Alex Marti Mercade, Barcelona (ES)

( * ) Notice: Subject to any disclaimer, the term of this patent is extended or adjusted under 35 U.S.C. 154(b) by 0 days.

(21) Appl. No.: 11/257,545

(22) Filed: Oct. 25, 2005

(65) Prior Publication Data

US 2006/0182610 A1  Aug. 17, 2006

(51) Int. Cl.
B65G 47/24 (2006.01)

(52) U.S. Cl. .................. 198/393; 198/397.02

(58) Field of Classification Search ............ 198/392, 198/393, 395, 397.01, 397.02, 397.05
See application file for complete search history.

(56) References Cited

U.S. PATENT DOCUMENTS

| 1,989,924 | A | | 2/1935 | Hill | |
|---|---|---|---|---|---|
| 2,777,561 | A | * | 1/1957 | German | 198/393 |
| 3,174,614 | A | * | 3/1965 | Ponsen | 198/380 |
| 3,295,659 | A | | 1/1967 | Aidlin | |
| 3,506,840 | A | * | 4/1970 | Fink | 250/223 B |
| 3,910,407 | A | * | 10/1975 | Sterling | 198/399 |
| 4,130,194 | A | | 12/1978 | Schindel et al. | |
| 4,681,209 | A | | 7/1987 | Marti | |
| 4,819,784 | A | * | 4/1989 | Sticht | 198/395 |
| 5,065,852 | A | * | 11/1991 | Marti | 198/392 |
| 5,549,189 | A | * | 8/1996 | Martisala | 198/380 |
| 6,065,587 | A | * | 5/2000 | Schindel | 198/465.1 |
| 6,216,845 | B1 | * | 4/2001 | Polese | 198/398 |
| 6,961,638 | B2 | * | 11/2005 | Ouellette | 700/213 |
| 2001/0022260 | A1 | * | 9/2001 | Ronchi | 198/397.02 |
| 2004/0011623 | A1 | * | 1/2004 | Sala | 198/373 |

FOREIGN PATENT DOCUMENTS

| DE | 26 51 495 | | 5/1978 |
|---|---|---|---|
| ES | 8407454 | | 12/1984 |
| WO | WO8607040 A1 | * | 12/1986 |
| WO | WO 01/72617 A1 | | 10/2001 |

* cited by examiner

Primary Examiner—Mark A Deuble
(74) Attorney, Agent, or Firm—RatnerPrestia (57) ABSTRACT

Comprises a pre-orientating device (2) suitable for placing a plurality of articles (50) in the vertical position, randomly head up or head down, on a conveyor (1); detection means (3) for detecting the articles (50) that are in at least one of said positions, head up or head down, on conveyor (1); and ejection means (4) for selectively ejecting from conveyor (1) those articles (50) that are in one of said undesired head up or head down positions, on the basis on said detection. It optionally comprises reloading means (15) suitable for picking up those articles (50) that are ejected from conveyor (1) by ejection means (4), conveying them and loading them again into pre-orientating device (2).

15 Claims, 4 Drawing Sheets

ARTICLE POSITIONING MACHINE

This application claims priority of Spanish Application Serial No. P200402535 filed on Oct. 25, 2004.

1. Scope of the Invention

This invention relates generally to an article positioning machine, and more particularly to an apparatus for positioning articles in the upright position, selectively head up or head down as desired. The positioning machine of this invention can be used to upright empty containers, such as bottles for pharmaceutical products and others, either head up to be filled or head down to be cleaned prior to filling.

2. State of the Art

For a long time it has been known, for example, from patent U.S. Pat. No. 1,989,924, to use a rotary container that has in the periphery of its bottom wall a plurality of shaped openings for letting irregular articles pass through only in one predetermined orientation. Inside the container the articles are loaded disorderly, in bulk, and are housed randomly in said openings, when their orientation coincides with the shape of said openings. As the container turns, said openings drag the articles housed in them onto a stationary support surface, and in one section of the trajectory, the openings pass over a tilted groove through which the properly orientated articles are removed. This apparatus is useful for substantially flat articles with an asymmetric shape, but it is not suitable for other articles such as containers.

Also article positioning apparatuses are well known that are provided with a pre-orientating device suitable for placing a plurality of articles in the horizontal or lying down position, in cavities arranged on the periphery of a rotary structure and an orientating device suitable for placing the pre-orientated articles into the vertical position. In said cavities, the articles can be pre-orientated at random with the head in the front or rear part vis-à-vis the moving direction, when the cavities are arranged tangentially, or with the head in an inner or outer part, when the cavities are in a radial arrangement. Said orientating device works by dropping each article from its cavity into an orientation conduit located below it in said rotary structure or fixed in a stationary position. In each compartment or in the entrance to the orientation conduit a combination of end stops and supports are provided, which interact with the article so that it always falls in the upright position. A removal device transfers the articles orientated in the vertical position, head up, from the orientation conduits to an exit conveyor.

Patents U.S. Pat. No. 3,295,659, DE-A-2651495 and ES-A-8407454, the latter in the name of this applicant, describe different examples of rotary positioning machines of the type described above. These apparatuses are relatively complex and cumbersome, and are useful for articles such as containers, bottles or small drums, which generally stand up well in the head up position, but are not very stable when head down.

International patent application WO 01/72617, in the name of this applicant, describes an automatic linear machine comprising a pre-orientating feeder for feeding articles from a container, where the articles are in disorder in bulk, to a linear conveyor, where the articles are arranged in the lying down position, pre-orientated in the longitudinal direction, with their head placed either in the rear or front part with respect to the moving direction of said conveyor. Said linear conveyor has associated selector means suitable for removing from the conveyor those articles that arrive advancing with their head in one undesired part, either rear or front. In this way, only those articles pre-orientated in the desired position remain on the conveyor, which articles are then supplied to an orientating station suitable for arranging the articles vertically, head up, and aligned on an exit conveyor.

The said pre-orientating feeder comprises essentially first and second tilted planes where the disordered articles are received. These first and second tilted planes converge in a dropping space defined by two vertical planes, separated by a distance that is slightly greater than the smallest transverse dimension of the articles, said dropping space being arranged in alignment on an initial part of said linear conveyor. Said selector means include detection means for detecting the front or rear position of the head of the articles advancing on the conveyor, and an ejection device that can push those articles detected by said detection means to be in an undesired position, off the conveyor.

This pre-orientating feeder is not provided with individual cavities for receiving the articles, and therefore the separation between the articles that are pre-orientated on the conveyor is not controlled. For this reason, two or more adjacent articles can be in contact on the conveyor, which can hinder detection and ejection operations. Also, said pre-orientating feeder is useful for elongated articles, that are longer than their width, which tend to lie in a horizontal position on the conveyor. However, it is not very effective for other types of articles, such as bottles for pharmaceutical products and others, that are only slightly longer than their width.

Moreover, in order to place the articles in the vertical position, this apparatus requires the said orientating station as well as the conveyor, the pre-orientating feeder and the selector means.

This invention provides an article positioning machine, useful for articles that are only slightly taller than their width and relatively stable in the vertical position, both head up and head down, that is relatively simple, compact and economical, and adaptable to different shape and size articles.

SUMMARY OF THE INVENTION

This invention contributes to achieving its goals and others by providing an article positioning machine, comprising, in combination: a conveyor; a pre-orientating device suitable for placing a plurality of articles in the vertical position, head up or head down at random, on said conveyor; detection means for detecting those articles that are in at least one of said positions, head up or head down, on the conveyor; and ejection means for selectively ejecting from the conveyor those articles that are in one of said undesired head up or head down positions, on the basis of said detection.

Said pre-orientating device includes a rotary structure mounted and driven to rotate with respect to a shaft. On said rotary structure a circular surface is mounted and arranged for receiving articles disordered in bulk, and a plurality of cavities are joined to the rotary structure and placed between a circular periphery of said surface and a closing wall. Each cavity is sized to accept only an article in the vertical position, either head up or head down.

Said cavities have an open bottom, and under the trajectory of the cavities a stationary support plane is provided on which the articles are dragged by the cavities as the rotary structure rotates. Said support plane includes an interruption from which there continues a conveying surface of said conveyor. Diversion means are included to divert the articles from the respective cavities to the conveyor through an opening in said closing wall, as the rotary structure rotates.

The cavities are placed at regular angular intervals with respect to the shaft of the rotary structure, which determines that the plurality of articles is placed by the pre-orientating device on the conveyor separated at regular intervals.

The fact that the articles clearly advance separately on the conveyor, facilitates the position detecting operation to be performed by the said detection means and the ejection of those articles detected to be in a undesired position, which is to be performed by said ejection means.

Advantageously, the positioning machine of this invention comprises reloading means suitable for picking up those articles that are ejected from the conveyor, transporting them and loading them again into the pre-orientating device. The same reloading means can be used to load bulk articles into the pre-orientating device for the first time, in batches or continually. The positioning machine of this invention also includes adjustment means for varying the height and/or width of the cavities so as to adapt them to different height and/or width articles.

At any event, the positioning machine of this invention is specifically intended for articles that are only slightly taller than their width and are relatively stable in the vertical position, both head up and head down. Many bottles, for example, for pharmaceutical products and others, are proportioned in this way and have a relatively wide mouth which confers considerable stability in the head down position. The detection and ejection means are controlled by electronic means, and simply by varying programmed control parameters, the positioning machine can position the bottles either head up for filling or head down for cleaning prior to filling.

The positioning machine according to this invention is relatively simple, compact and economical, because it uses only one conventional conveyor, a simple rotary pre-orientating device, and detection and ejection means. Also, the positioning machine can be adapted to different shape and size articles.

BRIEF DESCRIPTION OF THE DRAWINGS

The above features and advantages of this invention will be understood more clearly from the following detailed description of some embodiments with reference to the attached drawings, in which.

DETAILED DESCRIPTION OF SOME EMBODIMENTS

Figure 1:
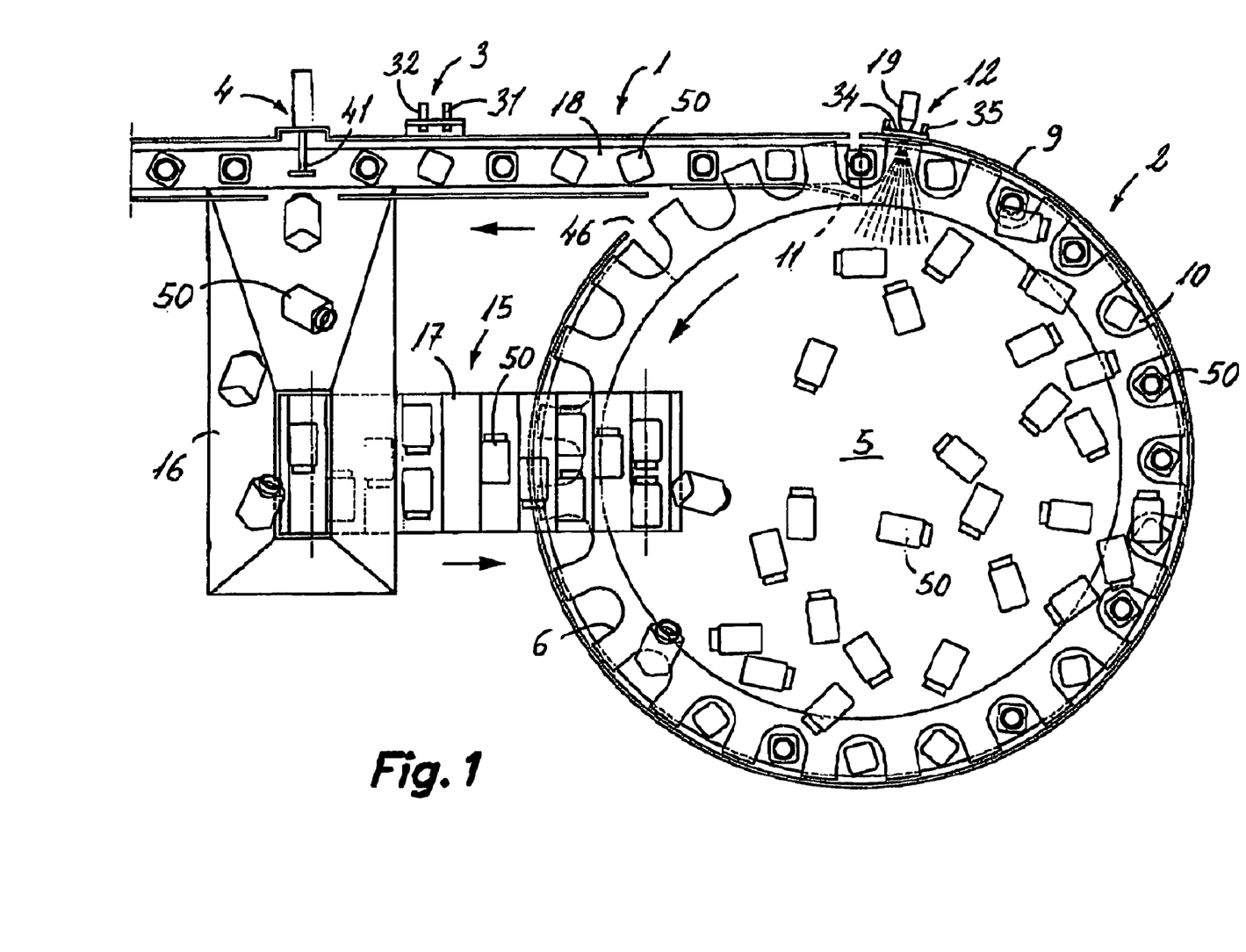
FIG. 1 is a diagrammatic plan view of a positioning machine according to one embodiment of this invention.
Figure 2:
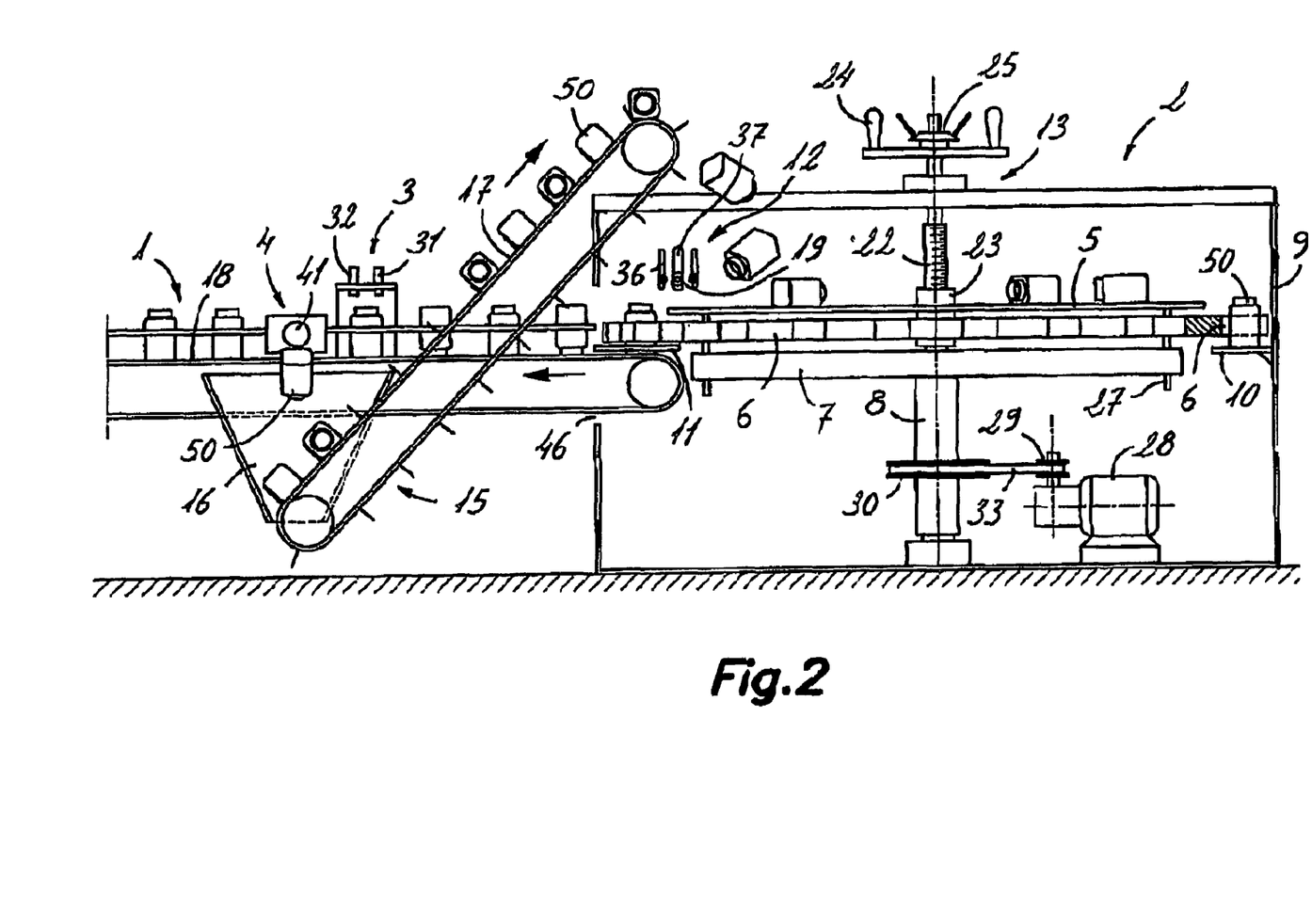
FIG. 2 is a side elevation diagrammatic view of the positioning machine in FIG. 1.

First of all with reference to FIGS. 1 and 2, they are a diagrammatic representation of an article positioning machine according to this invention, which comprises a conveyor 1 of any conventional type, such as, for example, a continuous belt conveyor or a support plate chain conveyor, etc. Said conveyor 1 has a conveying surface 18 which moves continually and on which a plurality of articles 50 can be placed and transported. A pre-orientating device 2, described in detailed below, is suitable for placing said plurality of articles 50 in the vertical position, at random head up or head down, on said conveying surface 18 of conveyor 1. Next to an area of conveyor 1 detection means 3 are provided for detecting in which position, head up or head down, each article 50 is in on conveyor 1. Next to another area of conveyor 1, downstream of said detection means 3, ejection means 4 are provided for selectively ejecting from conveyor 1 those articles 50 that are in an undesired position, head up or head down, and which have been identified previously by a detection operation performed by said detection means 3.

Pre-orientating device 2 comprises a rotary structure 7 mounted so as to rotate with respect to shaft 8 and driven, for example, by an electric motor 28 connected by means of a pulley 29, 30 and belt 33 or chain system (FIG. 2). On said rotating structure 7 a circular surface is provided 5, arranged to receive articles 50 disorderly in bulk. Around said surface 5 there is a closing wall 9 which, together with surface 5, forms a container for articles 50. Also a plurality of cavities 6 are joined to rotary structure 7, said cavities being located between a circular periphery of said surface 5 and said closing wall 9. Each cavity 6 is suitably sized to accept an article 50 only in the vertical position, either head up or head down. When rotating structure 7 turns around, articles 50 tend to move due to the centrifugal force towards closing wall 9, and given their particular shape, they tend to fall into the vertical position inside cavities 6.

Said particular shape of articles 50 consists in their being slightly higher than they are wider, cavities 6 being suitably sized according to a height to width ratio of article 50 to cause the spontaneous drop of article 50 in the vertical position inside cavity 6. Also, the particular shape of articles 50 must guarantee that said articles are sufficiently stable to be transported in the vertical position, either head up or head down, by said conveyor 1.

FIGS. 5 to 10 show, as an example, one of said articles, which consists in a bottle for pharmaceutical products or others. Purely as a guideline, the height to width ratio of this illustrated bottle is included in the range of 1.3:1 to 1.6:1. In this example, the bottle has an approximately square base, and the smallest width measurement has been taken vis-à-vis the above ratio. If the width measurement is taken to be the size of the diagonal of the base, then the height to width ratio would be even smaller. On the other hand, the bottle has a relatively wide mouth 54, which provides good stability when the bottle is in a vertical position head down resting on its mouth 54. Obviously, other articles 50 can fulfil the indicated conditions by means of shapes and proportions, other than those illustrated.

Each cavity 6 has an open bottom, and underneath a large part of the trajectory followed by the cavities when rotating together with rotary structure 7 a stationary support plane 10 is provided, on which articles 50 rest and by sliding on said plane the articles 50 are dragged by cavities 6. Said support plane 10 has an interruption just where conveying surface 18 of conveyor 1 begins, so that conveying surface 18 of conveyor 1 is substantially coplanar to support plane 10, with a minimum separation as possible between them. Diversion means 11, in the form of railings or similar, are included to divert articles 50 from cavities 6 to conveyor 1, or in other words, from support plane 10 to conveying surface 18 of conveyor 1, through an opening 46 in said closing wall 9, as rotary structure 7 rotates.

Since cavities 6 are distributed in said pre-orientating device 2 at regular angular intervals with respect to the rotating shaft 8 of rotary structure 7, articles 50 are placed on conveyor 1 separated from each other at regular intervals. This has the advantage that it facilitates the detection and ejection operations performed by said detection 3 and ejection 4 means on articles 50 on conveyor 1.

It is possible that, when rotary structure 7 rotates, some articles 50 approach closing wall 9 without falling into the cavities or lying on top of other articles 50 already housed in cavities 6. In order to prevent these articles placed inconveniently from exiting through said exit opening 46 in closing wall 9, the pre-orientating device 2 is provided with clearing means 12 that clear them when they reach the location of said diversion means 11, as rotary structure 7 rotates. According to an embodiment illustrated in FIGS. 1 and 2, said clearing means 12 include a nozzle 19 connected to a source of pressurised air, which is arranged to provide a jet of air above cavities 6 that can push those articles 50 placed on top of cavities 6 and/or those articles 50 placed on top of articles 50 already housed in cavities 6, towards an inner part of surface 5. Alternatively, according to another embodiment shown in FIG. 3, clearing means 12 comprise one or more pushing wheels 20 provided with a plurality of flexible spatulas and/or fingers 21 and driven to rotate continuously on top of cavities 6 with the same purpose.

The positioning machine according to this invention is provided with various regulating means whereby the positioning machine can be adapted to a range of articles 50 having different shapes, sizes and proportions. Also, as shown in FIG. 2, pre-orientating device 2 comprises height regulating means 13 for varying the distance between surface 5 and stationary support plane 10 in order to adapt cavities 6 to different height articles 50. In this embodiment, said height regulating means 13 comprise a spindle 22 mounted coaxially in relation to shaft 8 and coupled to a nut 23 that is attached to surface 5. A handle 24 makes it possible to turn spindle 22 to raise or lower surface 5. A check nut device 25 is used to fix the selected height. In general, cavities 6, which lie slightly lower than surface 5, are joined to a support structure 26 (FIG. 4) which moves together with surface 5. The ensemble of surface 5 and cavities 6 includes, for example, guide bars 27 for guiding their movements in relation to rotary structure 7.

Regulating the height of cavities 6 requires regulating the position of the above-mentioned clearing means 12. To do this, pre-orientating device 2 is provided with means for varying the position of said ejection means 12 vis-à-vis surface 5 so as to adapt ejection means 12 to different size articles 50. Therefore, in the embodiment illustrated in FIGS. 1 and 2, nozzle 19 is mounted on a support 34 provided with screws 35 passed through elongated holes 36 in closing wall 9, leaving nozzle 19 facing a corresponding elongated hole 37 in the closing wall. The height of nozzle 19 with respect to closing wall 9 can be regulated by loosening screws 35, moving support 34 to the desired position, and re-tightening screws 35. A person skilled in the art would know other devices for moving nozzle 19 with the same result without departing from the scope of the invention.

Figures 3, 4:
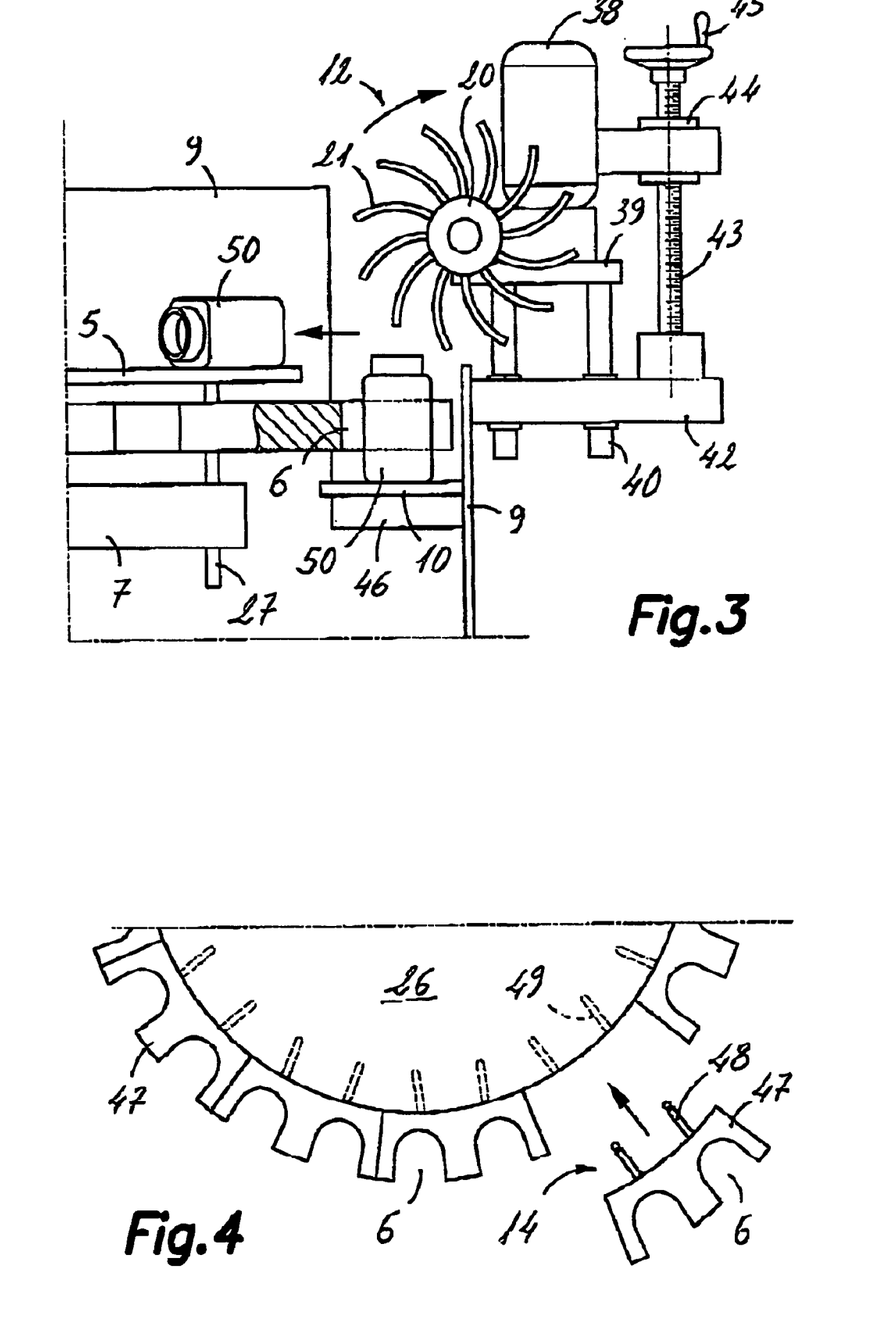
FIG. 3 is a side elevation diagrammatic view showing an alternative embodiment of clearing means provided on the positioning machine.
FIG. 4 is a partially diagrammatic plan view of width regulating means for varying the width of the cavities in the positioning machine.

In the embodiment illustrated in FIG. 3, said pushing wheel 20 is coupled to a motor reducer unit 38 mounted on a mobile support 39, which is provided with guide bars 40 inserted into corresponding holes in a fixed support 42 joined to closing wall 9. A spindle 43 is mounted to rotate in fixed support 42 and is coupled to a nut 44 that is attached to the mobile support 39 or reducer unit 38. A handle 45 makes it possible to turn spindle 43 to move pushing wheel 20 with respect to closing wall 9 so as to select its position in accordance with the position of surface 5 and cavities 6. Obviously, a person skilled in the art would know other devices for moving pushing wheel 20 with the same result and without departing from the scope of the invention.

FIG. 4 shows width regulating means 14 incorporated into pre-orientating device 2 for varying the width of cavities 6 so as to adapt said cavities 6 to different width articles 50. Cavities 6 are formed in a plurality of segments 47 placed around said support structure 26 forming a circular crown wheel. Each segment has one or more pins 48 suitable for coupling into a socket in corresponding housings 49 formed in support structure 26. The width of the cavities can be changed by substituting a set of segments 47 with cavities of one width with another set of segments 47 with cavities of a different width. It should be mentioned that it is not essential for a whole number of cavities 6 to be formed in each segment 47, and some cavities 6 can be defined by the co-operation of partial configurations formed in adjacent segments 47.

Figure 5:
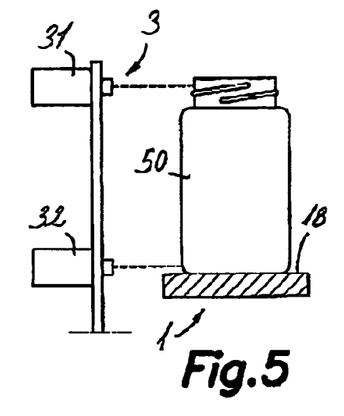
FIG. 5 is a detailed front elevation diagrammatic view of an embodiment of detection means for detecting the position of an article on a conveyor of the positioning machine.
Figure 6:
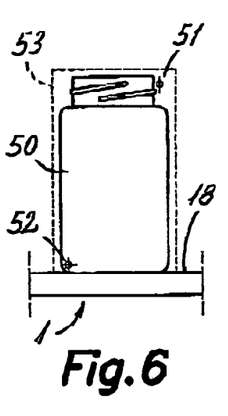
FIGS. 6 and 7 are detailed side elevation diagrammatic views illustrating the identification of two possible positions of the article on the conveyor by means of the detection means in FIG. 5.
Figure 7:
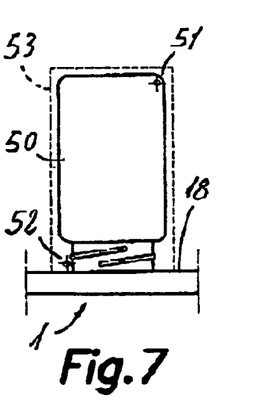

With reference to FIGS. 5 a 10, a description is provided below for said detection means 3, which comprise at least two sensors 31, 32 placed so as to simultaneously detect the presence or absence in at least two different areas of a space traversed by article 50 as said article is moved on conveyor 1. Said sensors 31, 32 can be any kind that is normally used in this technical field, and they can emit signals that can be processed by electronic means. Thus, said electronic means determine the head up or head down position of article 50 on the basis of the processing of said signals produced by sensors 31, 32, and said electronic means produce signals for activating said ejection means 4 to eject only those articles detected as being in an undesired position. According to the illustrated embodiment, ejection means 4 include an ejector 41 in the form of an end stop fixed to the end of a rod in a fluidly driven piston and cylinder unit that can be activated by said electronic means according to the undesired head up or head down position of article 50 determined beforehand by detection means 3. Alternatively, said ejector could include an air blowing nozzle controlled by a valve that can be activated by said electronic means, or any other equivalent device that a person skilled in the art may think of without departing from the scope of the invention.

In the embodiment illustrated in FIG. 5, the two sensors 31, 32 are in a horizontal position, at different heights and longitudes with respect to conveying surface 18 of conveyor 1 (also see FIG. 1). In this position, the two sensors 31, 32 detect simultaneously the presence or absence of the material of article 50 in two different side areas 51, 52 in a space 53 (represented symbolically by means of dotted lines in the figures). When an article 50 placed head up (FIG. 6) traverses said space 53, as said article is moved on conveyor 1, the first sensor 31 detects an absence of material in the first side area 51 while the second sensor 32 detects the presence of material in the second side area 52. In this case, the electronic means are adapted for interpreting that container 50 is in the head up position. On the other hand, when an article 50 placed head down (FIG. 7) traverses space 53, the first sensor 31 detects the presence of material in the first side area 51 while the second sensor 32 detects the absence of material in the second side area 52. In this case, the electronic means are adapted for interpreting that container 50 is in the head down position.

Figure 8:
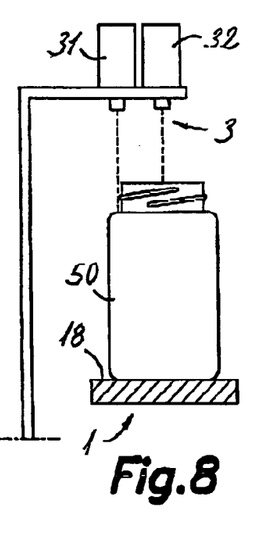
FIG. 8 is a detailed front elevation diagrammatic view of another alternative embodiment of the positioning machine's detection means.
Figure 9:
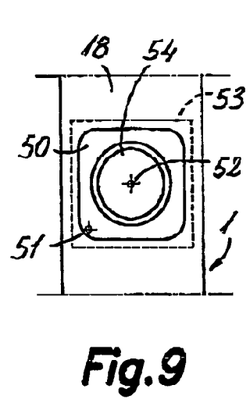
FIGS. 9 and 10 are detailed plan diagrammatic views illustrating the identification of two possible positions of the article on the conveyor by means of the detection means in FIG. 8.
Figure 10:
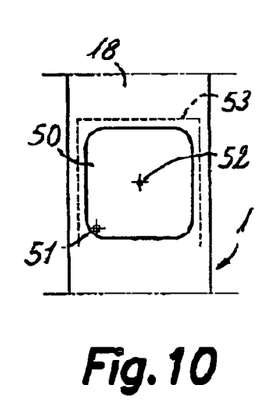

In the embodiment illustrated in FIG. 8, the two sensors 31, 32 are in a vertical position, at different heights and longitudes with respect to conveying surface 18 of conveyor 1 (also see FIG. 2). In this position, the two sensors 31, 32 detect simultaneously the presence or absence of the material of article 50 in two different upper areas 51, 52 of a space 53. When an article 50 in the head up position (FIG. 9) traverses said space 53, while said article is moved on conveyor 1, the first sensor 31 detects the presence of material in the first upper area 51 while the second sensor 32 detects the absence of material in the second upper area 52, which corresponds to a mouth opening 54 on article 50. In this case, the electronic means are adapted for interpreting that container 50 is in the head up position. On the other hand, when an article 50 in the head down position (FIG. 10) traverses space 53, both sensors 31, 32 detect the presence of material in both upper areas 51, 52, which correspond to the bottom of article 50. In this case, the electronic means are adapted for interpreting that container 50 is in the head down position. A person skilled in the art would know other detection devices for detecting the head up or head down position of container 50 on conveyor 1 without departing from the scope of the invention.

Advantageously, the positioning machine comprises reloading means 15 (FIGS. 1 and 2) suitable for picking up those articles 50 that are ejected from conveyor 1 by ejection means 4, conveying them and loading them again into pre-orientating device 2. For this purpose, according to the illustrated embodiment, said reloading means 15 include an inlet hopper 16 suitably arranged to directly receive said articles 50 ejected from conveyor 1, and an elevator device 17, of the conventional type, that can take articles 50 from the bottom of said inlet hopper 16, lift them and dump them onto surface 5 of pre-orientating device 2. Obviously, this same inlet hopper 16 can be used to receive other articles 50 in bulk that are to be loaded for the first time in pre-orientating device 2. These other articles 50 can be poured into inlet hopper 16 either in batches or continuously.

A person skilled in the art would be able to introduce variations and modifications into the above illustrated and described embodiments without departing from the scope of this invention as defined in the attached claims.

The invention claimed is:

1. Article positioning machine, said articles being stable in a vertical position, both head up and head down, comprising in combination:
    a conveyor;
    a pre-orientating device having a rotary structure mounted and driven so as to rotate with respect to a shaft, and a plurality of cavities joined to said rotary structure, each cavity being sized to accept an article only in a vertical position, either head up or head down;
    height regulating means to adapt the cavities to different height articles;
    diversion means for diverting articles from the cavities to said conveyor in said vertical position, randomly head un or head down, as said rotary structure rotates, the articles being placed at regular intervals on the conveyor;
    detection means for detecting those articles that are in at least one of said positions, head up or head down, on the conveyor; and
    ejection means for selectively ejecting from the conveyor the articles that are in an undesired one of said positions, head up or head down, on the basis of said detection.

2. The positioning machine, according to claim 1, wherein said pre-orientating device comprises a receiving surface mounted thereon and provided to receive articles disorderly arranged in bulk, said plurality of cavities being placed between a circular periphery of said receiving surface and a closing wall.

3. The positioning machine, according to claim 2, wherein each of said cavities has an open bottom wall provided to pass, as rotary structure rotates, above a stationary support plane over which articles are dragged by the cavities, said support plane having an interruption from which there continues a conveyor surface of said conveyor, said diversion means being arranged to divert the articles from the cavities to the conveyor through an opening in said closing wall.

4. The positioning machine, according to claim 3, wherein said height regulating means comprises means for varying the distance between surface and stationary support plane so as to adapt cavities to different height articles.

5. The positioning machine, according to claim 4, wherein said pre-orientating device comprises clearing means for separating those articles placed above the cavities and/or above articles housed in the cavities towards the receiving surface when arriving where said diversion means are located, as said rotary structure rotates.

6. The positioning machine, according to claim 5, wherein said pre-orientating device comprises width regulating means for varying the width of cavities so as to adapt cavities to different width articles.

7. The positioning machine, according to claim 6, wherein said pre-orientating device comprises means for varying the position of said clearing means with respect to the receiving surface so as to adapt clearing means to different size articles.

8. The positioning machine, according to claim 5, wherein said pre-orientating device comprises means for varying the position of said clearing means with respect to the receiving surface so as to adapt the clearing means to different size articles.

9. The positioning machine, according to claim 4, wherein the machine is adapted for handling articles that are stable enough to be conveyed in a vertical position, either head up or head down, by said conveyor.

10. The positioning machine, according to claim 4, wherein the machine is adapted for handling articles that are slightly higher than they are wider, the cavities being suitably sized according to a height to width relation of the article so as to make the article fall in a vertical position inside the cavity.

11. The positioning machine, according to claim 1, wherein said detection means comprises at least two sensors located to simultaneously detect the presence or absence in at least two different areas of a space that an article has to cross while said article is moved on the conveyor, and electronic means for determining the head up or head down position of the article by processing signals produced by said sensors.

12. The positioning machine, according to claim 11, wherein said ejection means comprises an ejector that can be activated by said electronic means according to the undesired head up or head down position of the article previously determined by the detection means.

13. The positioning machine, according to claim 1, further comprising reloading means adapted for collecting those articles that are ejected from the conveyor by said ejection means, conveying them and loading them again onto the pre-orientating device.

14. The positioning machine, according to claim 13, wherein said reloading means comprise an inlet hopper provided to receive as well said articles ejected from conveyor as other articles in bulk that are to be loaded for the first time, and an elevator device that can take the articles from the bottom of said inlet hopper, lift them and dump them onto the receiving surface of the pre-orientating device.

15. Article positioning machine, said articles being stable in a vertical position, both head up and head down, comprising in combination:

a conveyor;

a pre-orientating device having a plurality of cavities and adapted for placing a plurality of articles in a vertical position on said conveyor, randomly head up or head down, said pre-orientating device comprising height regulating means for varying a distance between a surface and stationary support plane so as to adapt the cavities to different height articles;

detection means for detecting those articles that are in at least one of said positions, head up or head down, on the conveyor; and ejection means for selectively ejecting from the conveyor the articles that are in an undesired one of said positions, head up or head down, on the basis of said detection.

* * * * *

UNITED STATES PATENT AND TRADEMARK OFFICE
CERTIFICATE OF CORRECTION

PATENT NO. : 7,258,222 B2  Page 1 of 1
APPLICATION NO. : 11/257545
DATED : August 21, 2007
INVENTOR(S) : Jaime Marti Sala and Alex Marti Mercade It is certified that error appears in the above-identified patent and that said Letters Patent is hereby corrected as shown below:

Title Page of Letters Patent: Item 30

FOREIGN PRIORITY  P200402535   ES   Oct. 25, 2004

Item 57

ABSTRACT
-- An article positioning machine is disclosed. The article positioning machine comprises a pre-orientating device suitable for placing a plurality of articles in the vertical position, randomly head up or head down, on a conveyor; detection means for detecting the articles that are in at least one of said positions, head up or head down, on conveyor; and ejection means for selectively ejecting from conveyor those articles that are in one of said undesired head up or head down positions, on the basis on said detection. It optionally comprises reloading means suitable for picking up those articles that are ejected from conveyor by ejection means, conveying them and loading them again into pre-orientating device.--

Claims of Letters Patent:

Column 8, line 27, claim 4, insert -- receiving -- after between.

Signed and Sealed this

Twenty-fifth Day of December, 2007

JON W. DUDAS
*Director of the United States Patent and Trademark Office*